US012811627B2

(12) United States Patent
Tornambe

(10) Patent No.: US 12,811,627 B2
(45) Date of Patent: Nov. 24, 2026

(54) NEAR FIELD COMMUNICATION CIRCUIT

(71) Applicant: STMicroelectronics International N.V., Geneva (CH)

(72) Inventor: Anthony Tornambe, Rousset (FR)

(73) Assignee: STMicroelectronics International N.V., Geneva (CH)

( * ) Notice: Subject to any disclaimer, the term of this patent is extended or adjusted under 35 U.S.C. 154(b) by 317 days.

(21) Appl. No.: 18/643,197

(22) Filed: Apr. 23, 2024

(65) Prior Publication Data

US 2024/0356583 A1 Oct. 24, 2024

(30) Foreign Application Priority Data

Apr. 24, 2023 (FR) ...................................... 2304100

(51) Int. Cl.
*H04B 5/22* (2024.01)
*H04B 5/43* (2024.01)

(52) U.S. Cl.
CPC ................ *H04B 5/22* (2024.01); *H04B 5/43* (2024.01)

(58) Field of Classification Search
CPC .................................. H04B 5/22; H04B 5/43
See application file for complete search history.

(56) References Cited

U.S. PATENT DOCUMENTS 8,622,313 B1 * 1/2014 McFarthing ....... G06K 19/0715 235/492
2006/0238301 A1 10/2006 Wu et al.
2012/0134444 A1 5/2012 Tsukamoto
2022/0103992 A1 * 3/2022 Tramoni ................ H04W 4/80

FOREIGN PATENT DOCUMENTS

EP 3413473 A1 12/2018

* cited by examiner

*Primary Examiner* — Tuan H Nguyen
(74) *Attorney, Agent, or Firm* — Slater Matsil, LLP

(57) ABSTRACT

A near-field communication circuit includes a first terminal coupled to a near-field communication antenna by a first resistor of the near-field communication circuit, a second terminal coupled to the near-field communication antenna by a second resistor of the near-field communication circuit, and a third resistor coupled to the first and second terminals and adapted to forming with each of the first and second resistors a voltage divider circuit. The third resistor is a resistor having an adjustable value.

15 Claims, 3 Drawing Sheets

NEAR FIELD COMMUNICATION CIRCUIT

CROSS-REFERENCE TO RELATED APPLICATIONS

This application claims the priority benefit of French patent application number 2304100, filed on Apr. 24, 2023 entitled "Circuit de communication en champ proche," which is hereby incorporated by reference in its entirety.

TECHNICAL FIELD

The present disclosure generally relates to electronic devices and, more particularly, electronic devices comprising a near-field communication (NFC) circuit.

BACKGROUND

Near-field communication is a wireless communication technology which allows a communication over a short distance, generally up to 1 m (for example, up to 10 cm), between two electronic devices, or NFC devices, for example between an NFC reader, and an NFC transponder, for example a card or a tag.

Near-field communication typically uses an electromagnetic field, or radio frequency signal (RF), around, or at, 13.56 MHz, generated by a first NFC device to detect, and communicate with, a second NFC device. According to the application, for a communication, the first NFC device operates in a reader mode, while the second NFC device operates in card emulation mode, or the first and second NFC devices both operate in peer-to-peer mode (P2P).

Each NFC device comprises a near-field communication antenna (NFC antenna) and a near-field communication circuit, or NFC circuit, comprising various elements or electronic circuits for generating and/or detecting a radio frequency signal by means of its antenna, to be able to exchange information with the other NFC devices according to a near-field communication protocol.

For example, an NFC circuit comprises a circuit adapted to controlling, in reader mode, the generation of a radio frequency signal to generate a carrier and modulate this carrier according to the data to be transmitted, and/or, in card emulation mode, the extraction of the carrier and of the transmitted data. Such a circuit may be designated under the term near-field communication controller, or NFC controller. An NFC controller is, for example, in the form of an integrated circuit. The NFC controller is generally coupled to other electronic circuits, for example an impedance matching circuit, which is itself coupled to the antenna, to optimize the radio frequency communication.

SUMMARY

According to an embodiment, a near-field communication circuit includes a first terminal coupled to a near-field communication antenna by a first resistor of the near-field communication circuit and a second terminal coupled to the near-field communication antenna by a second resistor of the near-field communication circuit. The near-field communication circuit further includes a third resistor coupled to the first and second terminals and adapted to forming with each of the first and second resistors a voltage divider circuit. The third resistor is a resistor having an adjustable value. In an embodiment, the near-field communication circuit further includes an adjustment circuit for adjusting the third resistor, the adjustment circuit being coupled to the first and second terminals, and being configured to send a control signal to the third resistor to vary a value of the third resistor. In an embodiment, the control signal results from an electric signal present at the first terminal and/or the second terminal. In an embodiment, the electric signal is an AC voltage between the first and second terminals, and the adjustment circuit includes a rectifier coupled to the first and second terminals and configured to transform the AC voltage into a DC voltage at an output of the rectifier, an analog-to-digital converter coupled to the output of the rectifier and configured to convert the DC voltage into a digital signal at an output of the analog-to-digital converter, and a control circuit coupled to the output of the analog-to-digital converter and configured to generate the control signal according to the digital signal and send it to the third resistor. In an embodiment, the control circuit includes a comparator configured to compare the digital signal with a limiting value, the control signal including a first state for controlling a decrease of the value of the third resistor if the digital signal is lower than the limiting value and/or a second state for controlling an increase of the value of the third resistor if the digital signal is greater than or equal to the limiting value, and a memory configured to store the limiting value. In an embodiment, the third resistor includes an array of resistors coupled to a switching system adapted to selecting one or more resistors from among the array of resistors. In an embodiment, the switching system includes a plurality of switches, each resistor of the array of resistors being coupled to a dedicated switch adapted to switching a respective coupled resistor. In an embodiment, the adjustment circuit is coupled to the switching system. In an embodiment, the control signal is intended to control turning on and/or turning off of one or more switches among the plurality of switches, the control signal including a plurality of components.

According to another embodiment, a method for controlling a third adjustable resistor of a near-field communication circuit including a first terminal coupled to a near-field communication antenna by a first resistor of the near-field communication circuit, a second terminal coupled to the near-field communication antenna by a second resistor of the near-field communication circuit, and the third adjustable resistor coupled to the first and second terminals and adapted to forming with each of the first and second resistors a voltage divider circuit, the method including adjusting a value of the third adjustable resistor according to an electric signal present at the first terminal and/or the second terminal. In an embodiment, adjusting the value of the third adjustable resistor is controlled by a control signal sent to the third adjustable resistor by an adjustment circuit included in the near-field communication circuit, the control signal resulting from the electric signal, the electric signal being a voltage between the first and second terminals. In an embodiment, the adjustment circuit converts the electric signal into a digital signal, compares it with a limiting value, and assigns to the control signal sent to the third adjustable resistor a first state for controlling a decrease of the value of the third adjustable resistor if the digital signal is lower than the limiting value, or a second state for controlling an increase of the value of the third adjustable resistor if the digital signal is greater than or equal to the limiting value. In an embodiment, the third adjustable resistor includes an array of resistors coupled to a switching system including a plurality of switches adapted to selecting one or more resistors from among the array of resistors, the control signal controlling turning on and/or turning off of one or more switches among the plurality of switches, the control signal including a plurality of components. In an embodiment, adjusting the value of the third adjustable resistor is performed in one or more iterations, by progressively increasing the value of the third adjustable resistor as long as the electric signal is below a threshold signal or a threshold value minus a margin, and/or during a polling procedure of another near-field communication circuit. In an embodiment, the first terminal is coupled to a first terminal of the near-field communication antenna and the second terminal is coupled to a second terminal of the near-field communication antenna; the near-field communication circuit further includes a near-field communication controller, the first and second terminals being terminals of the near-field communication controller, the third adjustable resistor being an internal resistor of the near-field communication controller, and the first and second resistors being resistors external to the near-field communication controller; the first and second terminals are input terminals of the near-field communication controller; or the first and second terminals are output terminals of the near-field communication controller.

According to yet another embodiment, a near-field communication device including a near-field communication circuit, the near-field communication circuit being coupled to at least one near-field communication antenna of the near-field communication device. The near-field communication circuit includes a first terminal coupled to the at least one near-field communication antenna by a first resistor of the near-field communication circuit, a second terminal coupled to the at least one near-field communication antenna by a second resistor of the near-field communication circuit, and a third resistor coupled to the first and second terminals and adapted to forming with each of the first and second resistors a voltage divider circuit. The third resistor us a resistor having an adjustable value. In an embodiment, the first terminal is coupled to a first terminal of the at least one near-field communication antenna and the second terminal is coupled to a second terminal of the at least one near-field communication antenna. In an embodiment, the near-field communication circuit further includes a near-field communication controller, the first and second terminals being terminals of the near-field communication controller, the third resistor being an internal resistor of the near-field communication controller, and the first and second resistors being resistors external to the near-field communication controller. In an embodiment, the first and second terminals are input terminals of the near-field communication controller. In an embodiment, the first and second terminals are output terminals of the near-field communication controller.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the protocols implemented during a near-field communication between two NFC devices are not described in detail, the described embodiments and implementation modes being compatible with usual protocols of near-field communication between two NFC devices. Similarly, the electronic circuits implementing these protocols have not all been described in detail, the described embodiments and implementation modes being compatible with usual electronic circuits enabling to implement these protocols.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

The NFC controller generally includes settings of its internal parameters that are intended to optimize the radio frequency communication and improve its performance. One of the aims of these settings is, for example, to limit the voltage at the input of the NFC controller. One or more disclosed embodiments overcome all or part of the drawbacks of known NFC circuits, in particular of NFC controllers. One or more disclosed embodiments allow for an NFC device capable of operating in card emulation mode and/or in reader mode.

In the following description, a near-field communication antenna may be designated with the term NFC antenna, or antenna.

Figure 1:
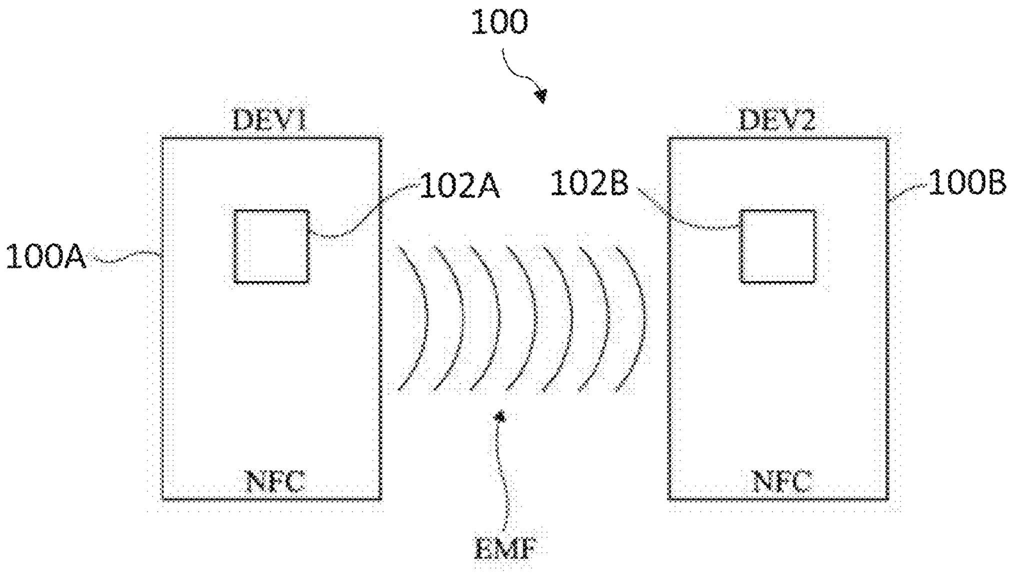
FIG. 1 schematically shows, in the form of blocks, an example of a near-field communication system of the type to which the embodiments apply.

FIG. 1 very schematically shows in the form of blocks an example of a near-field communication system 100 of the type to which apply, as an example, the described embodiments.

In this example, a first NFC device 100A (DEV1) communicates, by near-field electromagnetic coupling, with a second NFC device 100B (DEV2). According to the applications, for a communication, the first NFC device 100A operates in reader mode, while the second NFC device 100A operates in card emulation mode, or the two NFC devices 100A and 100B operate in peer-to-peer mode.

Each NFC device 100A, 100B integrates a near-field communication circuit, or NFC circuit, symbolized, in FIG. 1, by a block 102A, 102B. Near-field communication circuits 102A and 102B each comprise various elements or electronic circuits of generation/transmission and/or of detection/reception of a radio frequency signal by means of an antenna (not shown in FIG. 1) of the NFC device. During a communication between the first and second NFC devices 100A and 100B, the radio frequency signal generated by one of the NFC devices, for example the first NFC device 100A, can be captured by the other of the NFC devices, for example the second NFC device 100B located within range.

It can arbitrarily be considered, as illustrated in FIG. 1, that the first NFC device 100A can emit an electromagnetic field (EMF) to initiate a communication with the second NFC device 100B. The EMF field can be captured by the second NFC device 100B as soon as it is located within range. A coupling then forms between two oscillating circuits, that of the antenna of the first NFC device 100A and that of the antenna of the second NFC device 100B in this example.

For example, the first NFC device 100A is, or comprises, an NFC reader, the second NFC device 100B is, or comprises, an NFC transponder, for example a card or a tag.

Figure 2:
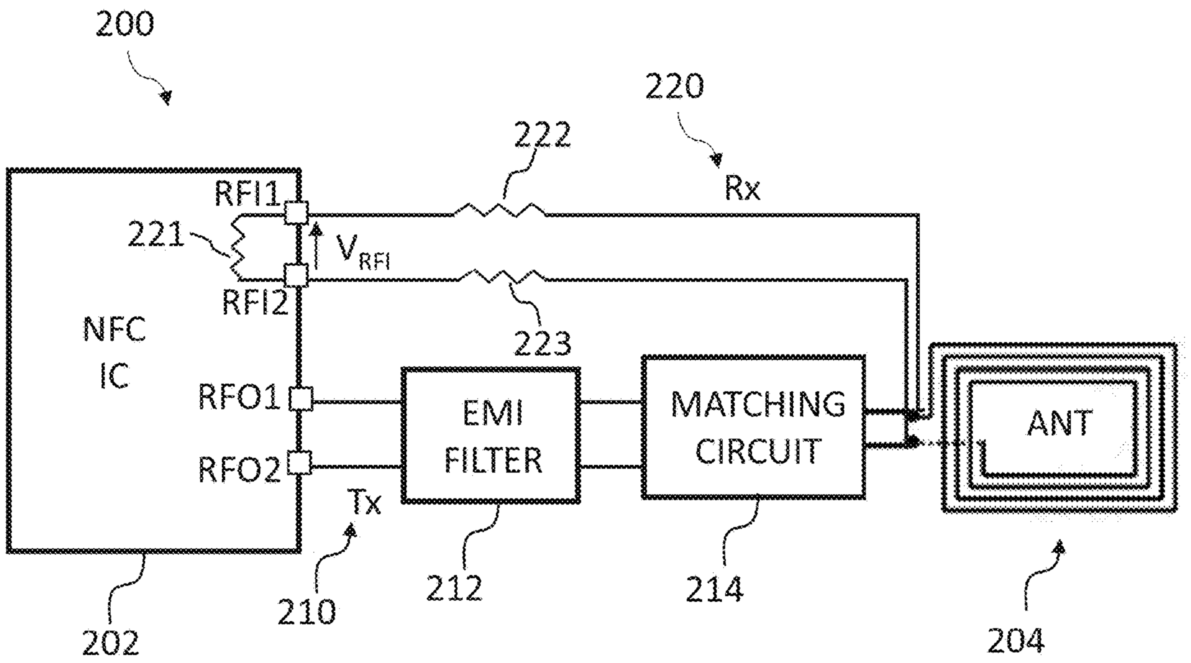
FIG. 2 schematically shows, in the form of blocks, an example of a near-field communication circuit.

FIG. 2 very schematically shows in the form of blocks an example of a near-field communication circuit 200 (NFC circuit). NFC circuit 200 forms part of an NFC device, for example similar to the first NFC device 100A of FIG. 1, and is coupled to a near-field communication antenna 204 of said NFC device.

According to this embodiment, NFC circuit 200 comprises a near-field communication controller 202 (NFC IC), or NFC controller, for example in the form of an integrated circuit.

NFC controller 202 comprises first and second input terminals RFI1 and RFI2 and first and second output terminals RFO1 and RFO2, coupled to antenna 204.

Antenna 204 may comprise one or a plurality of coils or inductive elements, for example in the form of a patch antenna or of a microstrip antenna. The at least one coil or inductive element is, for example, connected to, or comprised in, an oscillating circuit. Antenna 204 is configured to operate at a frequency in the order of 13.56 MHz, for example equal to 13.56 MHz.

The two output terminals RFO1, RFO2 are coupled to antenna 204 via a transmission circuit 210 (Tx) of NFC circuit 200.

For example, the two output terminals RFO1, RFO2 are coupled, preferably connected, to an electromagnetic interference filtering component 212 (EMI Filter), more simply called EMI filter in the rest of the disclosure. EMI filter 212 is coupled, preferably connected, to an impedance matching circuit 214 (Matching circuit). Impedance matching circuit 214 is coupled, preferably connected, to antenna 204.

An impedance matching circuit is typically configured to maximize the intensity of the signal transmitted or received by the NFC circuit by means of its antenna during a near-field communication with another NFC device. An impedance matching circuit generally comprises electric components such as capacitive elements, having capacitance values enabling to adapt the matching circuit to the required target impedance of the associated antenna.

EMI filter 212 and impedance matching circuit 214 have been shown as being external to NFC controller 202. As a variant, EMI filter 212 and/or impedance matching circuit 214 may be integrated in NFC controller 202.

The two input terminals RFI1 and RFI2 are coupled to antenna 204 via a reception circuit 220 (Rx) of NFC circuit 200.

In reader mode, output terminals RFO1 and RFO2 are adapted to transmitting data via transmission circuit 210 to another NFC device in card emulation mode. Input terminals RFI1 and RFI2 can receive in return data originating from this other NFC device in card emulation mode.

In card emulation mode, input terminals RFI1 and RFI2 are adapted to receiving data from another NFC device in reader mode via reception circuit 220. Output terminals RFO1 and RFO2 enable to transmit data in return in the card-to-reader direction.

The NFC controller generally requires settings of its internal parameters, intended to optimize the radio frequency communication and improve its performance. One of these settings may have the object of limiting voltage $V_{RFI}$ to the input terminals RFI1, RFI2 of the NFC controller, for example to avoid damaging the integrated circuit when the NFC controller is in the form of an integrated circuit.

To limit the voltage $V_{RFI}$ at the input terminals of the NFC controller, the NFC controller may comprise an internal resistor 221 (third resistor) coupled between input terminals RFI1, RFI2, this internal resistor forming a voltage divider circuit with each of two external resistors positioned in reception circuit 220, a first external resistor 222 (first resistor) coupled to first input terminal RFI1 and antenna 204, and a second external resistor 223 (first resistor) coupled to the second input terminal RFI2 and antenna 204.

By internal resistor, it is referred to a resistor of the NFC circuit forming part of the circuit of the NFC controller, and by external resistor, it is referred to a resistor of the NFC circuit which does not form part of the circuit of the NFC controller.

The value of this internal resistor is generally set, for example during a method of integration of the NFC circuit, and defined based on a maximum voltage $V_{RFI\_MAX}$ expected before division, and on a maximal voltage threshold $V_{THRESHOLD}$ not to be exceeded, the division ratio $R_{DIV}$ then being equal to $V_{RFI\_MAX}/V_{THRESHOLD}$. The value of the internal resistor is determined to respect this division ratio $R_{DIV}$, given the values of the external resistors, which are fixed.

A drawback thereof is that, with a fixed internal resistance value, the division ratio $R_{DIV}$ of the voltage divider circuit also remains fixed and applies in the same way, whatever the voltage before division, for example whatever the voltage at the level of antenna 204.

For example, the voltage divider is set for a 4.4 V voltage $V_{RFI\_MAX}$ and a peak-to-peak threshold voltage $V_{THRESHOLD}$ of 2.5 $V_{pp}$ (max voltage). For example, the 4.4-V voltage $V_{RFI\_MAX}$ corresponds to the voltage of a signal received from another NFC device, such as a tag, fully charged.

Even if the received signal is lower, and the voltage before division is lower, for example if the charge level of the other NFC device is low, the same division ratio $R_{DIV}$ is applied, and the voltage $V_{RFI}$ across input terminals RFI1, RFI2 is even lower due to the fixed division ratio.

When the charge level of the other NFC device is low, for example, the received voltage before division is in the order of 3 V, a voltage $V_{RFI}$ of approximately 1.7 $V_{pp}$ peak to peak can then be observed across the input terminals RFI1, RFI2 of NFC controller 202 due to the division ratio, which corresponds to a dynamic loss of approximately 32% with respect to the 2.5-$V_{pp}$ max voltage. Since the signal is lower than the max voltage level, it is more difficult to perform the data extraction.

This may make more difficult the decoding of the signal received from the other NFC device, or even cause the failure of the transactions between the two NFC devices.

The inventors provide a near-field communication circuit, or NFC circuit, which enables to overcome all or part of the previously-described drawbacks, in particular to solve the problem of protection against too high voltages in the NFC circuit, particularly at the input of an NFC controller, without degrading the reception of a signal originating from another NFC circuit.

Embodiments of NFC circuits will be described hereafter. The described embodiments are not limiting and various alterations will occur to those skilled in the art based on the indications of the present disclosure.

Figure 3:
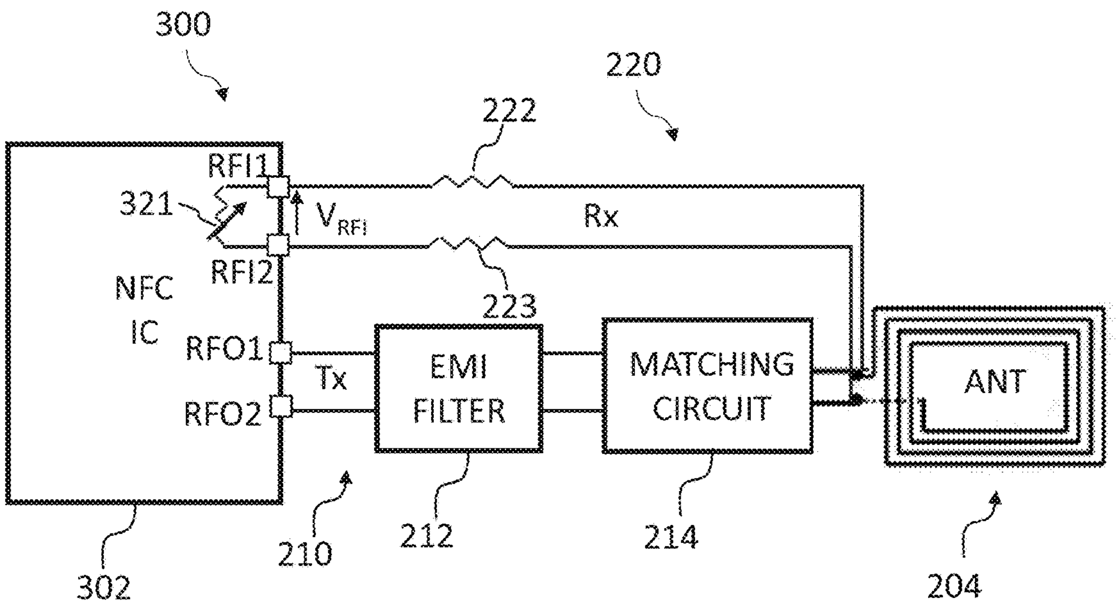
FIG. 3 schematically shows, in the form of blocks, a near-field communication circuit according to an embodiment.

FIG. 3 very schematically shows in the form of blocks a near-field communication circuit 300 (NFC circuit) according to an embodiment. NFC circuit 300 forms part of an NFC device, for example similar to the first NFC device 100A of FIG. 1, and is coupled to an antenna 204 of said NFC device.

Similarly to the NFC circuit 200 of FIG. 2, NFC circuit 300 comprises a near-field communication controller 302 (NFC IC), or NFC controller, for example in the form of an integrated circuit. NFC controller 302 comprises first and second input terminals RFI1 and RFI2 and first and second output terminals RFO1 and RFO2, coupled to antenna 204.

The two output terminals RFO1, RFO2 are, for example, coupled to antenna 204 by a transmission circuit 210 (Tx) similar to the transmission circuit of FIG. 2, comprising an EMI filter 212 and an impedance matching circuit 214 shown as being external to NFC controller 302. As a variant, EMI filter 212 and/or impedance matching circuit 214 may be integrated in NFC controller 302.

The two input terminals RFI1 and RFI2 are, for example, coupled to antenna 204 via a reception circuit 220 (Rx) similar to the reception circuit of FIG. 2, which comprises a first external resistor 222 coupled to the first input terminal RFI1 and to antenna 204, and a second external resistor 223 coupled to second input terminal RFI2 and antenna 204.

NFC circuit 300 differs from the NFC circuit 200 of FIG. 2 mainly in that the internal resistor 321 of NFC controller 302 is a settable resistor, or adjustable resistor, that is, a resistor having a value that can be adjusted (variable value). The adjustable resistor is also designated as "variable resistor" in the present disclosure.

Similarly to the internal resistor 221 of FIG. 2, internal resistor 321, coupled between the input terminals RFI1, RFI2 of the NFC controller, forms a voltage divider circuit with each of the two external resistors 222, 223 of reception circuit 220. However, conversely to FIG. 2, the division ratio of the voltage divider circuit can vary, by varying the value of internal resistor 321.

For example, the division ratio of the voltage divider circuit can be varied by varying the value of internal resistor 321 according to the voltage observed before division, for example the voltage detected across the terminals of antenna 204.

Thus, the level of the electric signal, here the voltage, received at the input terminals RFI1, RFI2 of the NFC controller can be adapted for each transaction between the NFC device and another NFC device. For example, this enables to avoid a dynamic loss of the signal received by the NFC device operating in card emulation mode, particularly when the battery level of the other NFC device operating in reader mode is low, and thus the signal sent by this other device is also low, and/or this enables to avoid for the coupling effect between the two NFC devices to induce a lower received signal.

The embodiments enable to protect the NFC controller from a too high voltage across its input terminals, and this, without degrading the reception of a signal originating from the other NFC device.

Further, the fact for variable resistor 321 to be on the reception circuit avoids impacting transmission circuit Tx, and thus the transmission of signals to the other NFC device.

As a variant, by positioning the variable resistor between the output terminals RFO1, RFO2 of the NFC controller of the NFC device, this may also enable to avoid a dynamic loss of the signal received by the other NFC device operating in card emulation mode, particularly when the battery level of the NFC device operating in reader mode is low.

Figure 4:
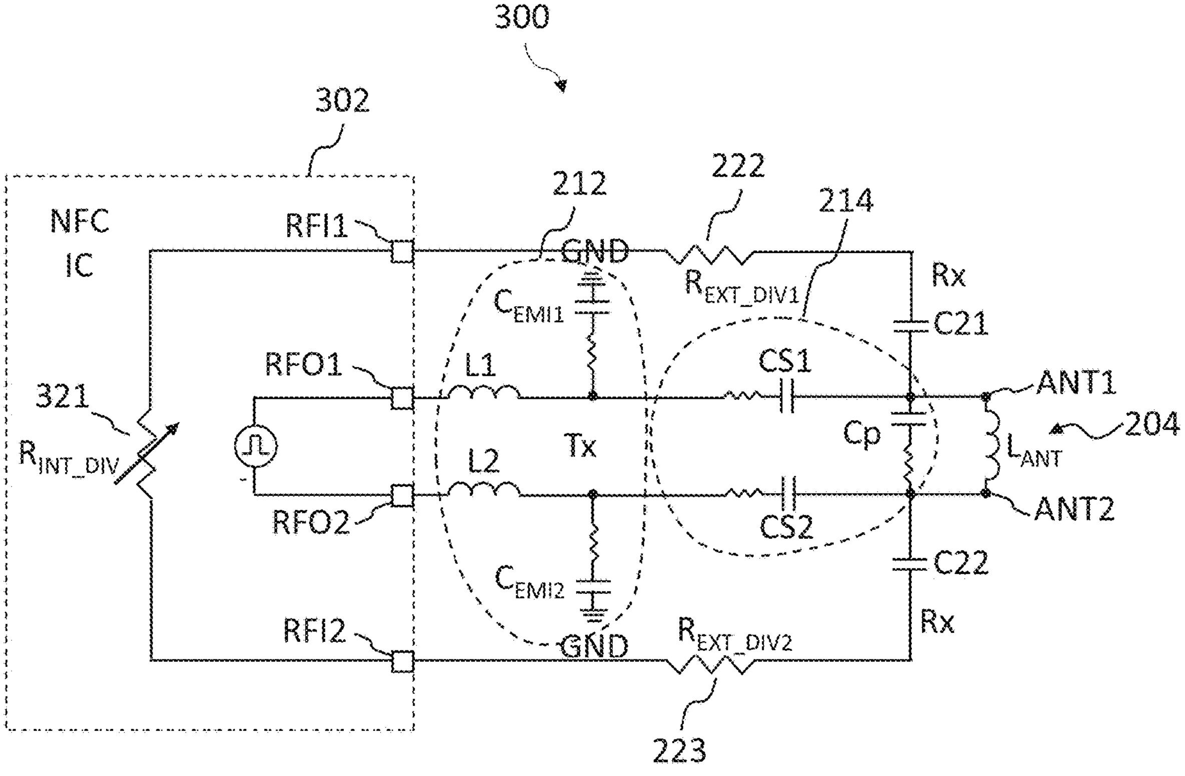
FIG. 4 schematically shows, in the form of blocks, an example of embodiment of the near-field communication circuit of FIG. 3.

FIG. 4 very schematically shows in the form of blocks an example of embodiment of the near-field communication circuit 300 of FIG. 3.

Antenna 204 is shown in the form of a coil $L_{ANT}$.

A first terminal ANT1 of antenna 204 is coupled to the first input and output terminals RFI1, RFO1 of NFC controller 302 while the second terminal ANT2 of antenna 204 is coupled to the second input and output terminals RFI2, RFO2 of NFC controller 302.

The first and second output terminals RFO1, RFO2 are adapted to the transmission of data to antenna 204 via the transmission circuit Tx of NFC circuit 300, while the first and second input terminals RFI1, RFI2 are adapted to the reception of data originating from antenna 204 via the reception circuit Rx of NFC circuit 300.

On transmission circuit Tx:

- EMI filter 212 is, for example, a filter of LC type comprising a first coil L1 coupled in series, between first output terminal RFO1 and ground GND, with a first capacitive element $C_{EMI1}$, and a second coil L2 coupled in series, between second output terminal RFO2 and ground GND, with a second capacitive element $C_{EMI2}$;
- impedance matching circuit 214 comprises a capacitive array comprising a third capacitive element CS1 coupled to the first coil L1 of EMI filter 204 and to the first terminal ANT1 of antenna 204, a fourth capacitive element CS2 coupled to the second coil L2 of EMI filter 204 and to the second terminal ANT2 of antenna 204, and a fifth capacitive element Cp in parallel on antenna 204, that is, coupled, preferably connected, to the first and second terminals ANT1, ANT2 of said antenna.

The capacitive elements of impedance matching circuit 214 are preferably selected to maximize the current in antenna 204 to increase the amplitude of the transmitted electromagnetic field.

On reception circuit Rx, the first terminal ANT1 of antenna 204 is coupled by a sixth capacitive element C21 and by the first external resistor 222 ($R_{EXT\_DIV1}$) to the first input terminal RFI1, and the second terminal ANT2 of antenna 204 is coupled by a seventh capacitive element C21 and by the second external resistor 223 ($R_{EXT\_DIV2}$) to the second input terminal RFI2. The sixth and seventh capacitive elements C21, C22 are, for example, adapted to filtering the DC component of the voltage at the output of antenna 204.

The transmission Tx and reception Rx circuits of the NFC circuit are given as an example and any other transmission circuit Tx and reception Rx circuit adapted to near-field communication may be suitable.

Figure 5:
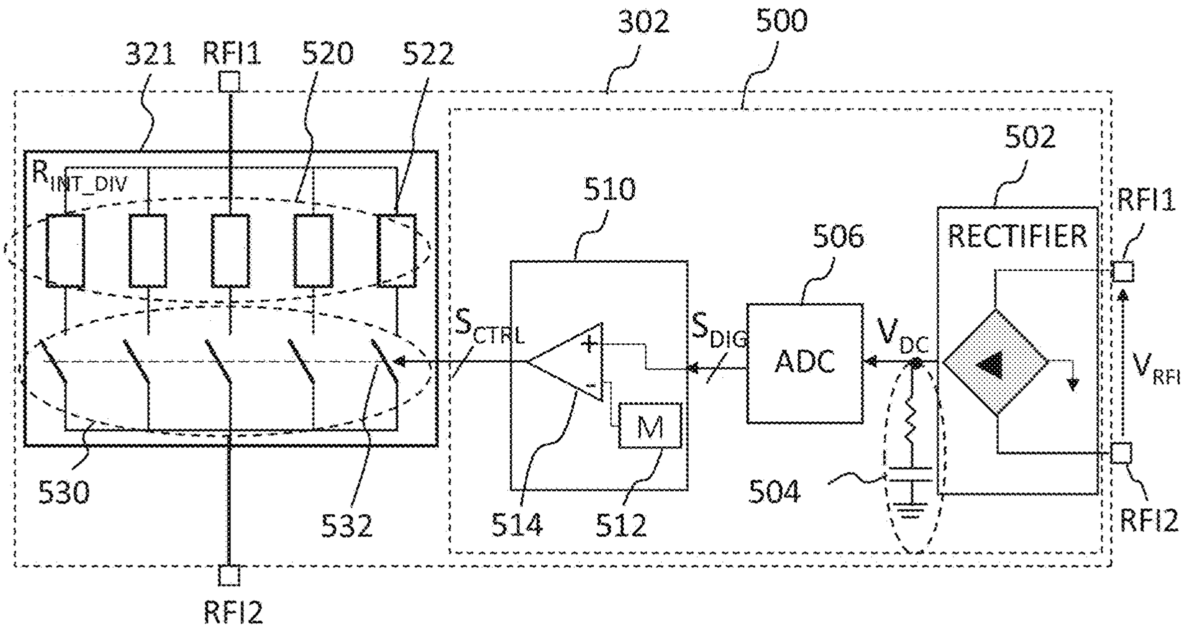
FIG. 5 schematically shows an example of embodiment of the NFC controller of FIG. 3 or of FIG. 4.

FIG. 5 schematically shows an example of embodiment of the NFC controller 302 of FIG. 3 or of FIG. 4.

NFC controller 302 comprises a circuit 500 for adjusting internal resistor 321, said adjustment circuit 500 being coupled to the input terminals RFI1, RFI2 and to said internal resistor of the NFC controller. Adjustment circuit 500 is adapted to adjusting internal resistor 321 according to a voltage $V_{RFI}$ across input terminals RFI1, RFI2.

Adjustment circuit 500 comprises an active rectifier 502 (RECTIFIER) coupled, for example connected, to the input terminals RFI1, RFI2 of NFC controller 302. Active rectifier 502 is, for example, referenced to ground via a ground rail, and can be configured to transform the AC voltage $V_{RFI}$ present between input terminals RFI1, RFI2 into a DC voltage $V_{DC}$ at the output of said active rectifier. A filter 504 may be provided at the output of active rectifier 502, or integrated in active rectifier 502.

Adjustment circuit 500 further comprises an analog-to-digital converter 506 (ADC) coupled, for example connected, to active rectifier 502, for example via filter 504, and adapted to converting DC voltage $V_{DC}$ into a digital signal $S_{DIG}$ forming a digital image of DC voltage $V_{DC}$, and thus also forming a digital image of the AC voltage $V_{RFI}$ present between input terminals RFI1, RFI2. Digital signal $S_{DIG}$ is for example an n-bit signal, where n is preferably in the range from 6 to 16.

Adjustment circuit 500 also comprises a control circuit 510, which is coupled, for example connected, to analog-to-digital converter 506.

Control circuit 510 comprises, for example, a memory (M) 512, or a register, and a comparator 514.

As a variant, the control circuit may be at least partly implemented by software means. For example, the control circuit may comprise a processing unit, or processor, configured to execute software, or firmware, implementing a comparison function.

Control circuit 510 is configured to send a control signal $S_{CTRL}$ to internal resistor 321, said control signal being intended to vary said internal resistance according to the digital signal $S_{DIG}$ sent by analog-to-digital converter 506.

In certain cases, control signal $S_{CTRL}$ comprises a plurality of components, for example, one component per switch 532 described hereafter.

The variable internal resistor 321 of NFC controller 302 comprises an array 520 of a plurality of resistors 522 in parallel, having equal or different values, where resistors 522 can be switched by switches 532 forming a switching system 530 adapted to selecting one (or a plurality of) resistor(s) from among the array of resistors.

Switches 532 are controllable by the control signal $S_{CTRL}$ originating from adjustment circuit 500, in the shown example originating from control circuit 510. Control signal $S_{CTRL}$ is configured to control the turning on, or the turning off, of one or a plurality of switches, and thus increase, or decrease, the number of resistors 522 to vary the value of internal resistor 321. This enables to form with each of the external resistors 222, 223 an adjustable voltage divider circuit, that is, having a division ratio $R_{DIV\_VAR}$ that can be varied.

For example, if all the switches are off, $R_{DIV\_VAR}$ may be equal to 1, and $R_{DIV\_VAR}$ may increase according to the number of switches in the on state.

Although variable internal resistor 321 has been described in the form of an array of a plurality of resistors in parallel connected and/or disconnected by switches, those skilled in the art will be capable of implementing other types of adjustable, or variable, resistor. For example, the array may comprise resistors in series.

An example of a method of adjusting internal resistor 321, implementing the NFC circuit 302 of FIG. 5, or an equivalent circuit, is now described.

NFC circuit 302 can generate an electromagnetic field, typically a carrier around 13.56 MHz, with no modulation. Control circuit 510 can then receive a digital signal $S_{DIG}$, which is a digital image of an AC voltage $V_{RFI}$ present between input terminals RFI1, RFI2, then determine a division ratio $R_{DIV\_VAR}$ enabling to obtain, after division, a voltage between input terminals RFI1, RFI2 which is below a defined threshold voltage $V_{THRESHOLD}$. Control circuit 510 can then adjust a value of internal resistor 321 enabling to obtain the determined division ratio $R_{DIV\_VAR}$, given the value of each of the external resistors 222, 223, by selecting the switch(es) 532 to be turned on and/or to be turned off. Control circuit 510 can then deliver a control signal $S_{CTRL}$ intended to turn on, or turn off, the selected switch(es) 532.

The adjustment of the value of internal resistor 321 may be performed in one or a plurality of iterations. For example, control circuit 510 may define a first value of internal resistor 321 enabling to have a first division ratio $R_{DIV\_VAR1}$ sufficiently high for voltage $V_{RFI}$ to remain lower than the defined threshold voltage $V_{THRESHOLD}$. Then, control circuit 510 may define a second value of internal resistor 321, smaller than the first value, to obtain a second division ratio $R_{DIV\_VAR2}$ smaller than the first division ratio $R_{DIV\_VAR1}$ and verify that voltage $V_{RFI}$ remains lower than the defined threshold voltage $V_{THRESHOLD}$. These operations may be repeated, for example if voltage $V_{RFI}$ remains lower than the defined threshold voltage $V_{THRESHOLD}$, or is lower than the defined threshold voltage $V_{THRESHOLD}$ minus a margin $\Delta V_{THRESHOLD}$.

If voltage $V_{RFI}$ is equal to or greater than threshold voltage $V_{THRESHOLD}$ or than threshold voltage $V_{THRESHOLD}$ minus a margin $\Delta V_{THRESHOLD}$, then control circuit 510 may define a third value of internal resistor 321, greater than the second value, for example equal to the first value.

The value of internal resistor 321 may be increased, for example if the division ratio is desired to be increased, or decreased, for example if the division ratio is desired to be decreased.

Comparator 514, or the processing unit, of control circuit 510 may be configured to compare digital signal $S_{DIG}$ with a limiting value $S_{THR}$, corresponding to threshold voltage $V_{THRESHOLD}$, or to threshold voltage $V_{THRESHOLD}$ minus margin $\Delta V_{THRESHOLD}$. For example, limiting value $S_{THR}$ may be stored in memory 512, or the processing unit, of control circuit 510.

Control signal $S_{CTRL}$ may comprise:

a first state for controlling a decrease of the value of the internal resistor if digital signal $S_{DIG}$ is lower than limiting value $S_{THR}$; and/or a second state for controlling an increase of the value of the internal resistor if digital signal $S_{DIG}$ is greater than, or greater than or equal to, limiting value $S_{THR}$.

The adjustment of the internal resistor of the NFC controller of an NFC circuit, or of an NFC device, may advantageously be performed during a procedure of "waking up" of another NFC circuit, or of another NFC device, within range, also designated as a "polling procedure", or "polling mode". During the polling procedure, the NFC device generates an electromagnetic field, or carrier, typically at 13.56 MHz, with no modulation, to leave time to the other NFC device possibly present in this electromagnetic field, to wake up and prepare to receive a communication, or a control signal, from the NFC device. This time may be designated with the term "guard time". Adjusting the internal resistor during the polling procedure enables to take advantage of the guard time, necessary to be able to perform a near-field communication, and sufficient to adjust the internal resistor, and to avoid impacting the information exchanges between NFC devices, since at this stage, there is no modulation of the carrier and thus no information exchanges. After the polling mode, if another NFC device is in the electromagnetic field of the NFC device, then the NFC device may start a procedure for establishing a near-field communication aiming at communicating with the other NFC device, this time by modulating its carrier, while the adjustment of the internal resistor has already been performed.

For example, during the polling procedure, the NFC device may transmit periodic polling frames, spaced apart from one another by intervals, during which it generates an electromagnetic field, a polling frame generally only comprising the carrier, typically at 13.56 MHz, with a modulation. A polling frame may comprise one or a plurality of transmit bursts. For example, each transmit burst is configured with a different type of modulation technology, is followed by a waiting time, during which the NFC device can wait for a possible answer from another NFC device in its field, and be preceded by a period during which the NFC device may configure the protocol of the burst according to the desired technology. The adjustment of the internal resistor may, for example, be performed during one of these periods which forms part of the guard time.

According to an embodiment, the implementation of a variable resistor in the NFC circuit of an NFC device may be combined with a device adapted to controlling the power of the field emitted by the NFC circuit of the NFC device in reader mode, such as the control device described in patent application EP3413473, which is incorporated herein by reference as provided by law.

Various embodiments and variants have been described. Those skilled in the art will understand that certain features of these various embodiments and variants may be combined, and other variants will occur to those skilled in the art. In particular, although the embodiments are more particularly described in relation with the reception circuit of the NFC circuit, for an NFC device then operating in card emulation mode, they may also apply to the transmission circuit of the NFC circuit, for an NFC device operating in reader mode, more generally to any NFC circuit, or operating mode of the NFC device. For example, a variable resistor may be coupled to the output terminals of the NFC controller, which are then each coupled to the near-field communication antenna by a fixed resistor similarly to what has been described with the input terminals. Further, although the embodiments are more particularly described in relation with an NFC controller, they may more generally apply to another element or electronic circuit of the NFC circuit which is desired to be protected from too a high voltage or current, while impacting as little as possible an input or output signal of said element or electronic circuit. Thus, more generally, the variable resistor may be coupled to terminals of an element or electronic circuit of an NFC circuit, each of these terminals being coupled to the near-field communication antenna via a fixed resistor. The variable resistor may be adjusted according to an electric signal, for example a voltage, present between its terminals.

An embodiment provides a near-field communication circuit comprising:

- a first terminal coupled to a near-field communication antenna by a first resistor of said communication circuit;
- a second terminal coupled to said antenna by a second resistor of said communication circuit; and
- a third resistor coupled to the first and second terminals and adapted to forming with each of the first and second resistors a voltage divider circuit, said third resistor being a resistor having an adjustable value.

According to an embodiment, the communication circuit comprises a circuit for adjusting the third resistor, said adjustment circuit being coupled to the first and second terminals, and being configured to send a control signal to the third resistor to vary the value of said third resistor.

According to an embodiment, the control signal results from an electric signal present at the first terminal and/or the second terminal, for example a voltage between the first and second terminals.

According to an embodiment, the electric signal is an AC voltage between the first and second terminals, and the adjustment circuit comprises:

- a rectifier coupled, for example connected, to the first and second terminals, and configured to transform the AC voltage into a DC voltage at the output of said rectifier;
- an analog-to-digital converter coupled, for example connected, to the output of the rectifier and configured to convert the DC voltage into a digital signal at the output of said analog-to-digital converter; and
- a control circuit, coupled, for example connected, to the output of the analog-to-digital converter, and configured to generate the control signal according to the digital signal and send it to the third resistor.

According to an embodiment, the control circuit comprises a comparator, or a processing unit, configured to compare the digital signal with a limiting value, the control signal comprising:

- a first state for controlling a decrease of the value of the third resistor if the digital signal is lower than the limiting value; and/or
- a second state for controlling an increase of the value of the third resistor if the digital signal is greater than, or greater than or equal to, the limiting value; the control circuit for example comprising a memory configured to store the limiting value.

According to an embodiment, the third resistor comprises an array of a plurality of resistors coupled to a switching system adapted to selecting one or a plurality of resistor(s) from among the array of resistors.

According to an embodiment, the switching system comprises a plurality of switches, each resistor of the array of resistors being coupled, for example connected, to a dedicated switch adapted to switching said resistor.

According to an embodiment, the adjustment circuit is coupled to the switching system.

According to an embodiment, the control signal is intended to control the turning on and/or the turning off of one or a plurality of switch(es) among the plurality of switches, the control signal comprising for example a plurality of components.

An embodiment provides a method for controlling a third adjustable resistor of a near-field communication circuit comprising a first terminal coupled to a near-field communication antenna by a first resistor of said communication circuit, a second terminal coupled to said antenna by a second resistor of said communication circuit, and the third resistor coupled to the first and second terminals and adapted to forming with each of the first and second resistors a voltage divider circuit, the method comprising the adjustment of the third resistor according to an electric signal present at the first terminal and/or the second terminal.

According to an embodiment, the adjustment of the third resistor is controlled by a control signal sent to said third resistor by an adjustment circuit comprised in the communication circuit, the control signal resulting from the electric signal, for example from a voltage between the first and second terminals.

According to an embodiment, the adjustment circuit converts the electric signal into a digital signal, compares it with a limiting value, and assigns to the control signal sent to the third resistor:

a first state for controlling a decrease of the value of the third resistor if the digital signal is lower than the limiting value; or a second state for controlling an increase of the value of the third resistor if the digital signal is greater than, or greater than or equal to, the limiting value.

According to an embodiment, the third resistor comprises an array of a plurality of resistors coupled to a switching system comprising a plurality of switches adapted to selecting one or a plurality of resistor(s) from among the array of resistors, the control signal controlling the turning on and/or the turning off of one or a plurality of switch(es) among the plurality of switches, the control signal comprising for example a plurality of components.

According to an embodiment, the adjustment of the third resistor is performed:

in one or a plurality of iterations, by progressively increasing the value of the third resistor as long as the electric signal is below a threshold signal or a threshold value minus a margin; and/or during a polling procedure of another near-field communication circuit.

According to an embodiment capable of applying to the communication circuit or to the control method:

the first terminal is coupled to a first terminal of the antenna and the second terminal is coupled to a second terminal of the antenna; and/or the communication circuit comprises a near-field communication controller, the first and second terminals being terminals of the controller, the third resistor being an internal resistor of the controller and the first and second resistors being resistors external to the controller; and/or the first and second terminals are input terminals of an electronic circuit of the communication circuit, for example of a near-field communication controller; or the first and second terminals are output terminals of an electronic circuit of the communication circuit, for example of a near-field communication controller.

An embodiment provides a near-field communication device comprising a near-field communication circuit such as previously described, said near-field communication circuit being coupled to at least one near-field communication antenna of the communication device.

Finally, the practical implementation of the described embodiments and variants is within the abilities of those skilled in the art based on the functional indications given hereabove.

What is claimed is:

1. A near-field communication circuit comprising:

a first terminal coupled to a near-field communication antenna by a first resistor of the near-field communication circuit;

a second terminal coupled to the near-field communication antenna by a second resistor of the near-field communication circuit;

a third resistor coupled to the first and second terminals and adapted to form, with each of the first and second resistors, a voltage divider circuit, the third resistor being a resistor having an adjustable value; and an adjustment circuit for adjusting the third resistor, the adjustment circuit being coupled to the first and second terminals, and being configured to send a control signal to the third resistor to vary a value of the third resistor, wherein the control signal results from an electric signal present at the first terminal and/or the second terminal, the electric signal is an AC voltage between the first and second terminals, and the adjustment circuit comprises:

a rectifier coupled to the first and second terminals and configured to transform the AC voltage into a DC voltage at an output of the rectifier;

an analog-to-digital converter coupled to the output of the rectifier and configured to convert the DC voltage into a digital signal at an output of the analog-to-digital converter; and a control circuit coupled to the output of the analog-to-digital converter and configured to generate the control signal according to the digital signal and send it to the third resistor.

2. The near-field communication circuit according to claim 1, wherein the control circuit comprises:

a comparator configured to compare the digital signal with a limiting value, the control signal comprising:

a first state for controlling a decrease of the value of the third resistor if the digital signal is lower than the limiting value; and/or a second state for controlling an increase of the value of the third resistor if the digital signal is greater than or equal to the limiting value; and a memory configured to store the limiting value.

3. The near-field communication circuit according to claim 2, wherein the third resistor comprises an array of resistors coupled to a switching system adapted to select one or more resistors from among the array of resistors.

4. The near-field communication circuit according to claim 3, wherein the switching system comprises a plurality of switches, each resistor of the array of resistors being coupled to a dedicated switch adapted to switch a respective coupled resistor.

5. The near-field communication circuit according to claim 4, wherein the adjustment circuit is coupled to the switching system.

6. The near-field communication circuit according to claim 5, wherein the control signal is intended to control turning on and/or turning off of one or more switches among the plurality of switches, the control signal comprising a plurality of components.

7. A method for controlling a third adjustable resistor of a near-field communication circuit comprising a first terminal coupled to a near-field communication antenna by a first resistor of the near-field communication circuit, a second terminal coupled to the near-field communication antenna by a second resistor of the near-field communication circuit, and the third adjustable resistor coupled to the first and second terminals and adapted to form, with each of the first and second resistors, a voltage divider circuit, the method comprising adjusting a value of the third adjustable resistor according to an electric signal present at the first terminal and/or the second terminal, wherein adjusting the value of the third adjustable resistor is performed:

in one or more iterations, by progressively increasing the value of the third adjustable resistor as long as the electric signal is below a threshold signal or a threshold value minus a margin; and/or during a polling procedure of another near-field communication circuit.

8. The method according to claim 7, wherein adjusting the value of the third adjustable resistor is controlled by a control signal sent to the third adjustable resistor by an adjustment circuit comprised in the near-field communication circuit, the control signal resulting from the electric signal, the electric signal being a voltage between the first and second terminals.

9. The method according to claim 8, wherein the adjustment circuit converts the electric signal into a digital signal, compares it with a limiting value, and assigns to the control signal sent to the third adjustable resistor:

a first state for controlling a decrease of the value of the third adjustable resistor if the digital signal is lower than the limiting value; or a second state for controlling an increase of the value of the third adjustable resistor if the digital signal is greater than or equal to the limiting value.

10. The method according to claim 8, wherein the third adjustable resistor comprises an array of resistors coupled to a switching system comprising a plurality of switches adapted to select one or more resistors from among the array of resistors, the control signal controlling turning on and/or turning off of one or more switches among the plurality of switches, the control signal comprising a plurality of components.

11. The method according to claim 7, wherein:

the first terminal is coupled to a first terminal of the near-field communication antenna and the second terminal is coupled to a second terminal of the near-field communication antenna;

the near-field communication circuit further comprises a near-field communication controller, the first and second terminals being terminals of the near-field communication controller, the third adjustable resistor being an internal resistor of the near-field communication controller, and the first and second resistors being resistors external to the near-field communication controller;

the first and second terminals are input terminals of the near-field communication controller; or the first and second terminals are output terminals of the near-field communication controller.

12. A near-field communication device comprising a near-field communication circuit, the near-field communication circuit being coupled to at least one near-field communication antenna of the near-field communication device, wherein the near-field communication circuit comprises:

a first terminal coupled to the at least one near-field communication antenna by a first resistor of the near-field communication circuit;

a second terminal coupled to the at least one near-field communication antenna by a second resistor of the near-field communication circuit; and a third resistor coupled to the first and second terminals and adapted to form, with each of the first and second resistors, a voltage divider circuit, the third resistor being a resistor having an adjustable value, wherein the near-field communication circuit further comprises a near-field communication controller, the first and second terminals being terminals of the near-field communication controller, the third resistor being an internal resistor of the near-field communication controller, and the first and second resistors being resistors external to the near-field communication controller.

13. The near-field communication device according to claim 12, wherein the first terminal is coupled to a first terminal of the at least one near-field communication antenna and the second terminal is coupled to a second terminal of the at least one near-field communication antenna.

14. The near-field communication device according to claim 5, wherein the first and second terminals are input terminals of the near-field communication controller.

15. The near-field communication device according to claim 5, wherein the first and second terminals are output terminals of the near-field communication controller.

* * * * *